United States Patent [19]

Maisel

[11] 4,388,493

[45] Jun. 14, 1983

[54] IN-BAND SIGNALING SYSTEM FOR FM TRANSMISSION SYSTEMS

[76] Inventor: Douglas A. Maisel, 2412-6th St., Berkeley, Calif. 94710

[21] Appl. No.: 211,307

[22] Filed: Nov. 28, 1980

[51] Int. Cl.³ .............................................. H04H 5/00
[52] U.S. Cl. ............................ 179/1 GD; 179/1 GN; 370/76
[58] Field of Search ............... 179/1 G, 1 GD, 1 GE, 179/1 GJ, 1 GN, 1 GS; 340/825.58; 369/86, 88; 370/76

[56] References Cited

U.S. PATENT DOCUMENTS

| | | | |
|---|---|---|---|
| 3,061,783 | 10/1962 | Noller | 340/825.58 |
| 3,280,260 | 10/1966 | Boothroyd et al. | 179/1 GD |
| 3,844,391 | 10/1974 | Crosby | 455/39 |
| 3,943,293 | 3/1976 | Bailey | 179/1 G |
| 4,016,366 | 4/1977 | Kurata | 179/1 GD |
| 4,124,779 | 11/1978 | Berens et al. | 179/1 GS |
| 4,246,440 | 1/1981 | Van der Heide et al. | 179/1 GD |
| 4,252,995 | 2/1981 | Schmidt et al. | 179/1 GD |
| 4,281,217 | 7/1981 | Dolby | 179/1 GN |

*Primary Examiner*—A. D. Pellinen

*Attorney, Agent, or Firm*—Fitch, Even, Tabin & Flannery

[57] ABSTRACT

An in-band signaling system for injecting at least one low frequency audio tone into an audio stereo signal includes a tone generator circuit and a circuit for generation of first and second component signals for each tone, each component signal being of substantially equal amplitude and opposite phase with respect to the other signal, the tone generator circuit being controlled to apply the tone or tones to the component generating circuit, to thereby provide an indication of the present state of auxiliary circuitry in an FM stereo transmission system. A first summing circuit injects the first component signal into the left channel of the stereo signal, while a second summing circuit injects the opposite phase component signal into the right channel of the stereo signal, such that when the left and right stereo channels are FM multiplexed in a conventional manner, the tone or tones appears only on the difference channel of said FM signal and not on the sum channel. A blend circuit eliminates stereo separation information between the left and right stereo channels below a certain cutoff frequency to enhance the detectability of injected tones of a frequency below the cutoff frequency.

22 Claims, 5 Drawing Figures

IN-BAND SIGNALING SYSTEM FOR FM TRANSMISSION SYSTEMS

The present invention relates to an in-band signaling system for FM transmission systems, and more particularly to an in-band signaling system wherein a low frequency audio tone is modulated onto the 38 kHz subcarrier of the FM signal and not directly onto the main carrier.

In-band signaling systems for transmitting control or coded signals as part of a regular audio program, between a transmitting station and a receiver, are known in the art. Such systems have been used, for example, to turn on receivers automatically for reception of emergency transmissions. Such in-band signaling systems are potentially very useful to indicate the present on or off state of auxiliary equipment being used by a broadcaster, e.g., noise reduction encoding circuitry, limiter circuits, which limit the amplitude of signals having a preselected frequency, quadraphonic multiplexing, etc. Such equipment would be especially desirable in FM broadcasting where improvement in the quality of the program sound provides a competitive advantage for the broadcaster. A reciver detecting the occurrence of these control or coded signals can be designed to operate in response thereto, e.g. by lighting a special light indicating that noise reduction encoding, quadraphonic sound, or some other feature, is being offered by the broadcaster. The receiver may also be designed to automatically activate its own auxiliary system, in conjunction with such an indication, to obtain improved sound quality in the program, or in some other manner, to take advantage of the feature offered.

However, as described in more detail below, prior art systems designed to take advantage of these features have had unacceptable problems, since, among other things, they tended to create unwanted interference with the normal program, or they were too complex and difficult to implement on already existing transmitter and receiver systems. Thus, although some of the above described improved broadcasting features have already been implemented by certain broadcasters, these improvements have largely gone unnoticed by listeners, due to the unavailability of an effective and acceptable prior art signaling system.

To understand the problems faced in prior art attempts to satisfactorily inject a signal or signals in-band as part of a broadcaster's FM multiplex stereo output signal, a brief background of FM stereo transmission organization is needed. Under FCC regulations, all FM broadcasters offering stereophonic programming transmit FM stereo signals as FM multiplex signals formatted in a "sum-difference" matrixing scheme. This matrixing scheme produces a composite signal from which the original stereo audio program can be reconstructed in standard stereo receivers. This composite signal includes a main channel, comprising the monophonic sum of the left and right audio program channels (L+R channel), and a subchannel, comprising the difference of the left and right audio program channels (L−R channel). This difference channel essentially carries stereo separation data, that is, data indicating the degree to which the audio at a given frequency in one channel differs in amplitude and phase from the audio of the same frequency in the other channel. The main channel (L+R) is directly modulated onto the FM carrier, while the subchannel (L−R) is amplitude modulated on a 38 kHz suppressed subcarrier, and the resulting double-sideband suppressed carrier signal is thereafter used to frequency modulate the main carrier in the same manner that the L+R channel does.

To indicate to a receiver that FM multiplex stereo is being transmitted, a 19 kHz pilot tone phase-locked to the suppressed subcarrier frequency is used to frequency modulate the main carrier. The major function of this "pilot carrier" is to provide a means to reconstruct accurately the suppressed 38 kHz subcarrier in the receiver, which is necessary for stereo detection. This pilot tone modulates the main carrier at a level of approximately 9% of full modulation. To enable the 19 kHz pilot tone to be detected cleanly by the receiver, i.e. to protect it from high frequency components of the audio program and other interference, the L+R channel is rolled off sharply by audio band limiting filters at a frequency of about 15 kHz, and the band of frequencies of the 38 kHz subcarrier is limited to be between 23 kHz and 53 kHz. The resultant band from 15 kHz to 23 kHz is called the guard band.

Prior art methods for adding signaling tones in addition to the 19 kHz pilot tone have attempted to use tones in a frequency range either inside the audio program bandwidth or outside of this band. One out-of-band tone signaling method used the 57 kHz harmonic of the 19 kHz pilot tone as the signaling tone, and added this tone to the composite signal at a low modulation level. In practice, this system produced interference and degraded multiplex performance under adverse reception conditions. In addition, because the 57 kHz signaling tone was outside of the program bandwidth it would not be easily injected with the program material. It required a special injection point between the stereo generator and the transmitter, often involving unacceptably difficult modification or replacement of parts in the broadcast plant. The injection point may also have to be made at a remote transmitter site, rather than at the broadcast station. In such a case, a separate communication link to control the tone from the station locale, where the apparatus, the state of which is being signaled, is located, to the tone injection point would also have been required. This method created analogous problems at a stereo receiver, since filters would make such a tone signal unavailable at the program outputs. A special tone extraction point would therefore have to be built into new receiver models for this method to be usable.

Prior art in-band signaling systems have suffered from other problems. The advantage of in-band signaling is that such signals can be injected with the aduio program. The obvious problem with in-band signaling systems is that such signals would be reproduced as audible sounds at a receiver, and thus be unacceptable to the listener. A tone sufficiently low in level to be inaudible at a receiver could be masked by the audio program, or may otherwise be insufficiently distinct to guarantee unambiguous reception of the tone, especially if the underlying FM signal is weak. A signaling system that generates an intermittent tone has been proposed, but such systems tend to be slow acting and possibly failure prone with certain types of program material.

In-band signaling systems for generating signals of a frequency at the lower end of the audio band, in the region below 50 Hz, also have had problems. The use of radical high pass filters to restrict competing bass energy in this region has been proposed, to eliminate signals of frequencies surrounding the tone. This method has generally been rejected by broadcasters, because the resultant degraded bass frequency response would be unacceptable to a listener. Tones of still lower frequencies, where less program energy is present, have traditionally been avoided by broadcasters, because the automatic frequency control (AFC) on many transmitters becomes unstable when they are modulated with such very low frequencies.

Consequently, most attention has been focused on the region at the high frequency edge of the program band, 15 kHz, on up to the pilot tone frequency of 19 kHz. One proposal called for a signaling tone extremely close to the 15 kHz band edge and the use of a narrow band signal detection technique to extract the tone at the receiver. This method hoped to take advantage of the guard band around the pilot tone, which uses audio band limiting filters to protect the pilot tone from competition with the audio program, to also protect the signaling tone. This method would rely on the relatively moderate effect of the above described audio band limiting filters close to the band edge, to allow injection of the tone with the program. The drawback with this approach is that the same filters which allow tone injection with the program inevitably pass a substantial amount of the audio program signal near the band edge, making signal detection of such signaling tones unreliable in this region.

The problem is exacerbated by filter performance that varies widely among different types of broadcast equipment. In addition, some kinds of signal processors in common use today, e.g., clippers that prevent overmodulation of the transmitter, add their own by-products to the clutter in this region of the guard band. As a result, even signal detectors designed to wait for a period of low ambiguity before indicating a change in state are failure prone, since no state change may ever occur in a useful period of time.

Use of a tone frequency above 15 kHz would involve substantially less clutter, but would also require a special injection point, having the problems and drawbacks mentioned above, since it would have to be injected after the audio band limiting filters. The presence of a signaling tone well within the guard band also may cause problems by its proximity to the pilot tone, problems of precisely the sort that the guard band was intended to avoid. Interference tones and intermodulation products have been observed with this system, with such interference often appearing at frequencies well into the program band, frequencies which may be of great auditory acuity in humans. At a signaling tone frequency of 17 kHz, for example, some tuners using stereo demodulators which cannot adequately reject inadvertant amplitude variations on the received 19 kHz pilot carrier, have created side band signals of 2 kHz, the difference in frequency between the 19 kHz pilot tone and the signaling tone frequency of 17 kHz. This is because this component appears as an audible tone in the difference channel (L−R) which is recovered by the stereo decoder. With signaling tone transmission levels of 55 db below 100% modulation at this frequency of 17 kHz, listeners using such receivers have reported interference serious enough to render spoken word programs unacceptable. Since such receiver interference mechanisms operate before a receiver's high frequency deemphasis circuits, such circuits could not help to reduce the signaling tone amplitude, and thereby its interference likelihood. The interferring tone is at a frequency of 2 kHz, which is well below the effective frequency range of such filters. Other variations of the guard band signaling scheme, e.g. with tones phased-locked to the pilot tone, should be even less likely to meet with acceptance from the broadcaster.

The present invention is an in-band signaling system which avoids the problems of the above-described prior art by providing a system wherein one or more low frequency audio tones are injected into the left and right program channels and added to the normal program audio in such a way that the transmitter is modulated by the tone or tones exclusively in the 38 kHz subcarrier L−R channel. In other words, each tone is transmitted entirely in the stereo separation subchannel. Specifically, means are provided for each signaling tone for generation of two component signals, each of equal amplitude and 180° out of phase with the other, and for summing one component signal with the left stereo channel and the other with the right stereo channel. When FM multiplexing of these channels has been completed, since these component signals are 180° out of phase, they cancel out and don't appear on the L+R channel, while on the L−R channel they appear at a signal strength of twice their separate signal strength.

The present invention takes advantage of the fact that below 200 Hz, signals indicating stereo separation can be characterized as being neither useful nor desirable for quality stereophonic audio reproduction. It is generally accepted that stereo separation signals in this low frequency region are in large part unusable since acoustically, a listener perceives almost no directional or separation information in normal listening enviornments at such low frequencies. Psychoacoustic research by Bell Telephone Laboratories and others over a period of more than 50 years has demonstrated the human hearing apparatus' inability to discern directional attributes of low frequency sounds. This is due to the long wavelengths of such signals as compared with normal microphone and loudspeaker spacings (in addition to human ear spacing). The benefit of modulating the signaling tone onto the 38 kHz subcarrier is that it avoids low frequency modulation of the stereo transmitter, since no signaling tone appears on the L+R channel. Consequently, the apparatus according to the present invention avoids the previously mentioned inherent problems such low frequency signals have had in prior art transmission systems.

A drawback of placing signals in the low frequency L−R channel is that false separation signals also tend to exist in this region as a result of shortcomings in the broadcasting equipment, the recorded media, or the recording technique. For example, these false or uncorrelated signals may be generated from poor magnetic tape erasure, turntable rumble, warped or poorly pressed records, or other unintended signal interference. Although not necessary to enable decoding of a signaling tone, a simple low frequency blend circuit may be made a part of the transmitter. Such a circuit would function to enforce the correlation between the left and right channels at the low frequencies of interest. That is, as an aid in the reliable detection of low level signaling tones, such a circuit would eliminate all stereo separation signals appearing between the left and right channels at these low frequencies, without affecting the frequency response of such low frequency signals. A low frequency blend circuit may be additionally beneficial since it would eliminate much of the above-described low frequency interference commonly existing in this frequency region, and would also lessen the amount of wasted transmitter power, signal to noise performance and transmission bandwidth used up transmitting such interference.

Intermodulation effects caused by these spurious impulses is also reduced. The benefits at a receiver are comparable, since the reduction of such interference eliminates waste of receiver amplifier power and loudspeaker low frequency power handling capacity.

Therefore, a principal object of the present invention is to provide an in-band signaling system wherein low frequency tones are inserted in a simple manner into the left and right channels in such a way that these tones are modulated only on the 38 kHz subcarrier and not on the main carrier of a stereo multiplex waveform.

A further object of the present invention is to provide an in-band signaling system wherein a tone can be detected at a receiver without requiring that the receiver be retrofitted, either by rewiring or by the need for a special tone extraction point, to take advantage of the system.

A further object of the present invention is to provide an in-band signaling system wherein a plurality of tones are available for insertion as part of the stereo signal, and wherein each tone may reflect the present state of a separate auxiliary circuit.

Another object of the present invention is to provide a means for coding said tone or tones, e.g. through AM modulation or FSK modulation of one or more of the tones to thereby provide a further level of sophistication in the information transferred by such tones between the transmitter and the receiver.

Yet another object of the present invention is to provide an in-band signaling system including a low frequency blend circuit for eliminating low frequency stereo separation information, thereby aiding in the reliable detection of the signaling tones transmitted in the low frequency region.

These and other objects and advantages of the present invention will become more apparent upon reference to the accompanying drawings and following description, wherein:

Figures 1, 2:
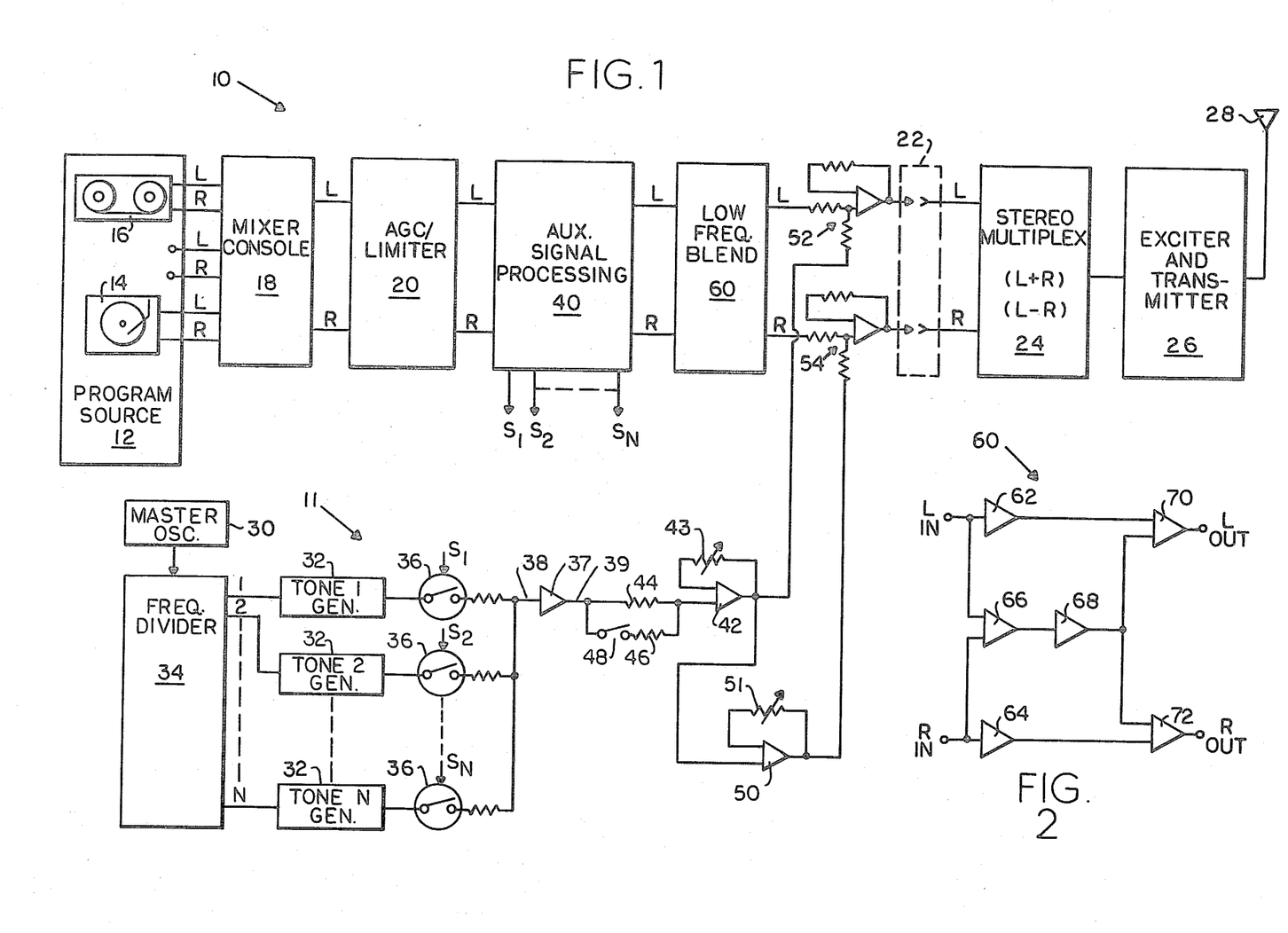
FIG. 1 is a schematic block diagram of an FM multiplex stereo transmission system including an in-band signaling system according to the present invention.
FIG. 2 illustrates a schematic blend circuit according to the present invention.

FIG. 1 shows a block diagram of a conventional FM multiplex stereo transmission system 10 with the addition of an in-band signaling system, shown generally at 11, according to the present invention. As seen in FIG. 1, the transmission system 10 is designed to take auido program material from a conventional program source 12 and to convert this audio into an output radio wave. Program source 12 may include a phonograph 14, a tape unit 16 and other conventional components not shown in the figure. These components 14 and 16 each usually produce conventional stereophonic audio frequency output signals comprising left (L) and right (R) stereo signal channels.

A mixer/console unit 18 provides a broadcaster with the means for controlling which of the program source 12 signals is to be output by the transmission system 10. Mixer/console 18 outputs the chosen signals on a single stereo channel, i.e., on only one left channel L and right channel R. The L and R stereo channels are fed into an automatic gain control (AGC) and limiter circuit 20. The AGC/limiter 20 provides conventional limiting and other correction of the amplitude of the stereo signals on the L+R channels to insure that excessively high strength signals are not fed out to the transmitter, with resultant distortions in the output radio signal.

The left and right stereo channels conventionally are fed to a remote location for final transmission of the audio program, e.g. a mountain top or other high locale, so that the geographic area of signal reception is maximized. Thus, the audio must usually be coupled to the remote locale from the broadcasting station over a conventional telephone line or other communication link, as schematically illustrated at 22. The stereo channels may be fed to a remote locale before they are operated by an AGC/limiter 20, and it is also common to feed a multiplexed composite signal to the remote locale for transmission thereof.

Usually, however, the audio signal left and right stereo channels are converted into a single stereo multiplex channel at the remote locale. This is done by a stereo multiplex circuit 24. As described above, the output of this unit is a single multiplexed signal comprising the sum of three components: the sum of the left and right channel signals thereon (L+R), a suppressed subcarrier operating at a 38 kHz rate and being amplitude modulated by the difference information (L−R) between the left and the right stereo channels, and a pilot carrier at one half the 38 kHz suppressed subcarrier frequency, i.e., 19 kHz, modulates the transmitter at a level of approximately 9% of maximum (100%) modulation.

The output of the stereo multiplex unit 24 is fed to a conventional exciter and transmitter 26 which outputs the multiplexed signal as an FM radio signal through an antenna 28.

The in-band signaling system according to the present invention, shown at 11 in FIG. 1, includes means for generating at least one low frequency audio tone. In the preferred embodiment, this is provided by means of a master oscillator 30 which feeds at least one tone generator 32. A conventional frequency divider 34 can be used to provide different input frequencies for each of a plurality of tone generators 32, i.e. tone generators 1−N. For example, in a preferred embodiment, the master oscillator 30 may be a crystal controlled oscillator which outputs a square wave of a fixed frequency. The frequency divider 34 may comprise a conventional digital divider chain, that functions to output square waves of different frequencies at its plurality of outputs 1−N. Thus the frequency signal output at point 1 of the frequency divider 34 may be frequency of 30 Hz, the frequency signal output at point 2 may be 25 Hz, and the frequency signal output at point N may be 20 Hz. Each of these frequency signals would then be converted into a sine wave in a conventional manner by an associated tone generator 32. For example, the S2559 integrated circuit chip manufactured by American Microsystems Inc. is designed to provide any of 16 related frequencies when it is driven from such a digital divider chain, with each output being a sine wave of inherently low harmonic distortion. Further substantial reduction of any harmonic distortion can be obtained by the addition of a low pass filter (not shown in the figure) positioned at the output of each tone generator 32. The cutoff frequency of such a filter would be chosen to allow the fundamental frequency of the sine wave to pass without attenuation, while attenuating the higher frequency harmonics.

The tone output from each tone generator 32 is individually controlled by means of a switch 36. Where there is more than one tone generator 32, the output of each switch 36 is fed into a conventional summing network 38 for summing together each tone and for outputting the tones on a single output conductor 39. Summing network 38 may include an operational amplifier 37 which may also be designed to operate in a conventional manner as the low pass filter described above. Whether the fixed frequency generated by a given tone generator 32 is coupled onto output conductor 39 depends on the state of the switch 36 associated with that tone generator 32. The on or off state of each switch 36 is controlled by the present state of auxiliary signal processing circuits, shown schematically at 40 in FIG. 1. Note that the illustrated position of the auxiliary signal processing circuitry 40 in the transmission system block diagram is to a certain extent arbitrary. In practice, a given type of signal processing of the signals on the left and right stereo channels may take place at many different points between the program source 12 and the transmitter 26, and is determined only by the needs of the specific auxiliary processing circuit being implemented.

For example, many broadcasters are now adding noise reduction circuitry to their systems, such as the Dolby 334 broadcast unit. The present invention provides means for enabling an indication of the existence of the operation of such a noise reduction circuit to be output as part of the FM multiplexed signal. This is preferably accomplished by causing the noise reduction circuitry to output a logic level control signal on line $S_1$, for example, which is operatively coupled to an associated switch 36, and acts to close this switch. This results in the coupling of a fixed frequency tone to the summing network 38. Of course, many other types of auxiliary circuits 40 may be added to the transmission system 10, with the present state of such systems used to output logic level control signals on respective control lines $S_2$-$S_N$, for controlling of corresponding switches 36. When each such switch 36 is caused to close, another different fixed frequency tone is coupled to the summing network 38, to indicate the operation of these additional circuits. The result is an audio frequency signal comprising one or more low frequency tones, each indicating the present operative state of a specific auxiliary circuit.

In summary, the above described control system enables the presence or absence of a tone of a predetermined frequency to indicate the state of a given associated apparatus.

A key feature of the present invention is the means by which the tone or tones, generated as described above, are combined with the normal audio program in such a way that it is substantially inaudible at an FM stereo receiver. This means comprises means for summing the tone or tones with the left and right stereo channels such that the tone signal is multiplexed only onto the L−R difference channel of the FM multiplexed stereo signal. Specifically, the tone or tones appearing on conductor 39 are fed into an amplifier 42 through a parallel path comprising a scaling resistor 44 in one path and a resistor 46 and switch 48 in the other path. The operation of resistor 46 and switch 48 is described hereinbelow. The output of amplifier 42 is fed into a second amplifier 50. Amplifier 50 acts to invert the output of amplifier 42 such that the outputs of amplifiers 42 and 50 approximate the exact same low frequency sine waves but with opposite polarity. That is, the output of amplifier 42 is 180° out of phase with the output of amplifier 50. The operation of variable resistor 43, connected in the feedback loop of amplifier 42, and variable resistor 51, connected in the feedback loop of amplifier 50, will be described herein below.

The output of amplifier 42 is also fed to a summing network 52 while the output of amplifier 50 is fed to a summing network 54. Summing network 52 sums the output of amplifier 42 with the left stereo channel, and summing network 54 correspondingly sums the output of amplifier 50 with the output of the right stereo channel. The choice of whether one or the other outputs of amplifiers 42 and 50 is added to the left or the right stereo channels is arbitrary.

In operation, the output of amplifier 42 comprises a first component signal. This signal is equal in amplitude and 180° out of phase with the output of amplifier 50, identified as a second component signal. The summing means 52 and 54 act to sum the first and second component signals with respectively the left and right stereo channels. Consequently, when such tones are multiplexed in the transmission system, when the tone component signals are added together in the multiplex circuit 24 to create the main carrier L+R, these tone component signals cancel since they are equal in amplitude but 180° out of phase, thereby preventing such tones from modulating the main carrier. However, since the tone component signals are 180° out of phase, they will modulate the L−R subcarrier, since their amplitudes add when one component is "subtracted" from the other, resulting in a tone level of twice their separate signal strength levels. Consequently, the audio signaling tones exist on the output FM stereo multiplex signal only on the L−R difference channel.

Calibration means are also provided to insure that the first and second component signals output by respective amplifiers 42 and 50 are substantially the same amplitude and as close to being 180° out of phase as is possible. Specifically, to calibrate these component signals, resistor 46 and switch 48 enable adjustment of the level of modulation of the subcarrier that is contributed by the component signals. Switch 48 comprises a calibration switch with functions to cause the output of amplifier 42 to be a predetermined multiple of its normal output when switch 48 is open. This permits a nominal reference level to be set when switch 48 is closed, while assuring that the normal signaling tone level is attenuated by a predetermined amount when switch 48 is opened. For example, with switch 48 closed, one might choose a level resulting in a modulation of the transmitter of 50%. Note that the contribution of the 19 kHz pilot tone to the total modulation, normally approximately 9%, would be ignored, since it does not modulate the L−R subchannel. Choosing a reference level of 50% modulation enables convenient reading of the modulation level and at the same time avoids activating any limiters, clippers or over-modulation prevention circuits that may exist in the signal path between where the signaling tone is added to the transmission system 10, and the transmitter 26. A 50% modulation reference level is 6 db below the 100% modulation level of the transmitter 26. If the attenuation when switch 48 is open is determined to be 40 db with respect to the modulation when switch 48 is closed, the level of modulation of a signaling tone when switch 48 is open will add up to be approximately 46 db below the 100% modulation point of transmitter 26.

Variable resistor 43 is provided to enable adjustment of the output signal strength of amplifier 42, thereby enabling adjustment of the injection level of the signaling tone or tones as input to the transmitter 26, so that a desired modulation level is obtained as described above with respect to the operation of switch 48. Variable resistor 51 enables the relative amplitudes of the outputs of amplifiers 42 and 50 to be adjusted over a range of several db, so that the outputs of each amplifier are as close to being equal in amplitude as possible. Since amplifier 50 is an inverting amplifier, the outputs of amplifiers 42 and 50 are always substantially 180° out of phase. To insure that a minimum signal exists on the L+R main carrier, the main carrier signal output by the multiplex unit 24 should be monitored when variable resistor 51 is being adjusted. An FM stereo modulation monitor, required by law as part of every stereo broadcast station, is conveniently used to make the measurements described here. In this case, it is the actual transmitter output that is precisely demodulated and its various components measured as described, and not the output of (24) directly. This enables compensating for any imbalance in the left and right stereo channel transmission paths all the way up to the input of the stereo multiplex unit 24.

A low frequency blend circuit, shown at 60 in FIG. 1, may also be added to provide for the elimination of stereo separation signals below a certain frequency point, thereby providing certain advantages described above. FIG. 2 illustrates a preferred embodiment of a low frequency blend circuit according to the present invention operative to eliminate such stereo separation signals in low frequency signals below, for example, 200 Hz. In other words, this circuit functions to insure that the left and right stereo channel signals are identical below a predetermined arbitrary low frequency point even through at the input to the blend circuit, such signals may be considerably different. This blend circuit is designed to have no effect on stereo separation above this predetermined low frequency point. For example, the blend circuit may be designed to be effective below 40 Hz and have little effect at 50 Hz or above, restoring stereophonic separation to at least 30 db at 50 Hz, with increased separation of greater than 50 db at higher frequencies. As seen in FIG. 2, the left and right audio frequency stereo channels are input to respective amplifiers 62 and 64 which are "all-pass" networks as described below. The left and right stereo channels are also fed to a difference amplifier 66 which derives an audio difference signal similar to the L−R signal generated by the stereo multiplex unit 24. The output of difference amplifier 66 is fed to a low pass filter 68 having a cutoff frequency at the predetermined frequency below which the blend circuit is designed to operate. The output of low pass filter 68 for signals below the cutoff frequency, is composed of the stereo separation between the left and right stereo channels. No signal is output from low pass filter 68 for stereo separation signals substantially above this cutoff frequency.

The low frequency difference signals output from filter 68 are algebraically combined with the left and right stereo channels by means of amplifiers 70 and 72, such that the output of both amplifier 70 and amplifier 72 comprises approximately one-half of the sum of the left and right stereo channels below the cutoff frequency of the low pass filter 68. This occurs as follows: amplifier 70 outputs the algebraic difference, $L-\frac{1}{2}(L-R)$ or $\frac{1}{2}(L+R)$, whereas amplifier 72 outputs the algebraic sum, $R+\frac{1}{2}(L-R)$, or again $\frac{1}{2}(L+R)$. Listeners with monophonic receivers receive the sum of these two outputs, or (L+R), as they should. Thus, the differences in these stereo signals L and R with respect to one another below this frequency are eliminated. For stereo separation signals of a frequency beyond the cutoff frequency of the low pass filter 68, since the output of the filter 68 diminishes to 0, amplifiers 70 and 72 allow the input left and right stereo channels respectively to pass undisturbed. Consequently, above the cutoff frequency, stereo separation is retained while below the cutoff frequency stereo separation is eliminated.

The all-pass networks incorporated in amplifiers 62 and 64 are apart of the blend circuit to ensure that the same phase shift is created in the left and right stereo channels as is created by low pass filter 68 over the frequency range wherein filter 68 has a significant output. This insures that the shape of the combined response of this network will be as desired, accurately reflecting the algebraic combination of the amplitudes of the left and right stereo channels as attenuated by low pass filter 68.

Note that the above described blend circuit 60 may also be used in a receiver or other detector to achieve low frequency blend of stereo signals below a certain cutoff frequency. Such a circuit would enable signaling tones to be recoverable from the output of filter 68, and would also have the advantage of removing these tones along with any other low frequency stereo separation data from the signal path, without imposing any limits on the program channel frequency response.

Figures 3, 4, 5:
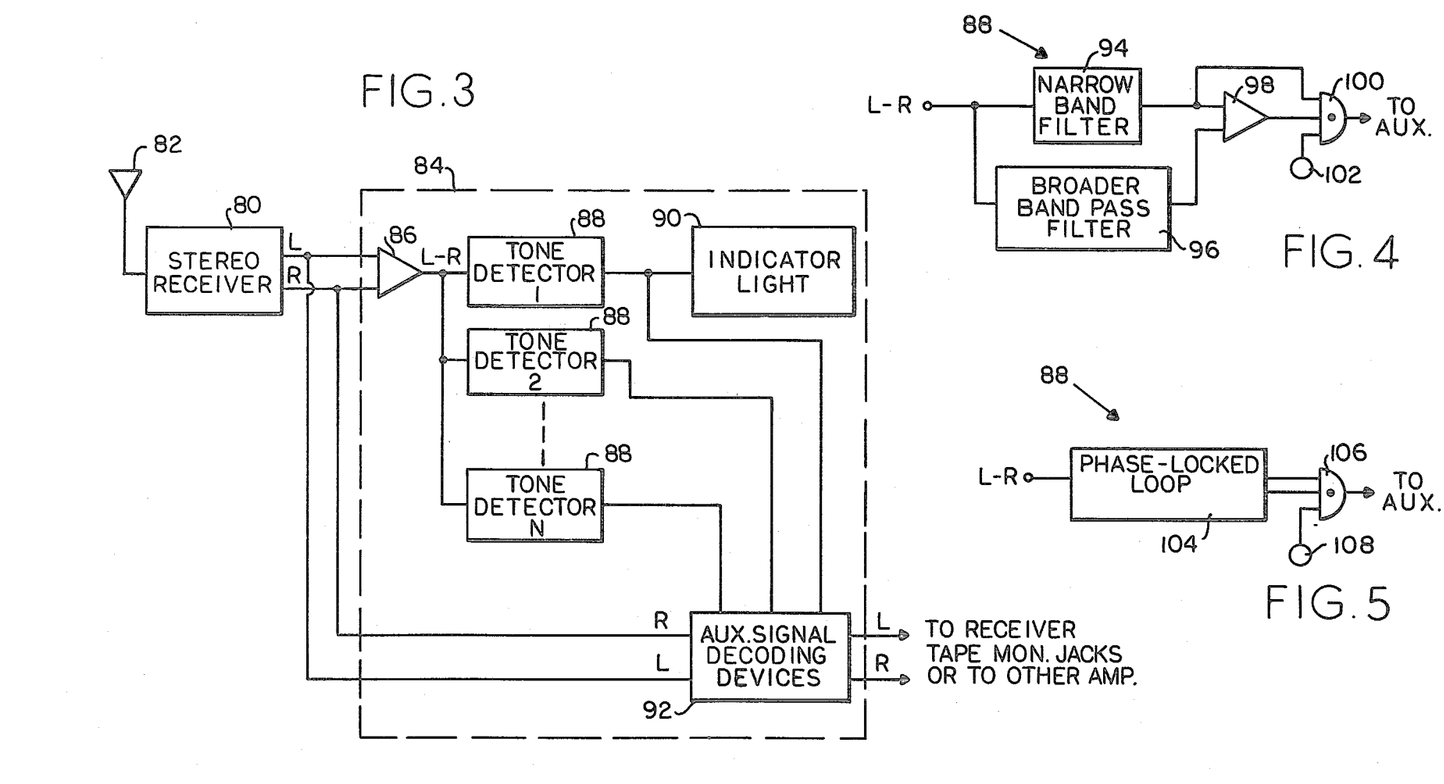
FIG. 3 is a schematic block diagram of a circuit for receiving and detecting one or more tones on an FM multiplex stereo signal according to the present invention.
FIG. 4 illustrates one embodiment of a tone detector shown in FIG. 3.
FIG. 5 illustrates an alternate embodiment of a tone detector shown in FIG. 3.

FIG. 3 illustrates a schematic block diagram of a circuit for receiving and detecting one or more signaling tones on an FM multiplex stereo signal according to the present invention. One advantage of the present invention is the fact that the signaling tone or tones in the audio frequency band enable such tones to be detected and extracted without the necessity of modifying the circuits in a conventional receiver in order to have access to a special extraction point. This is an important consideration in convincing any broadcaster to add such an in-band signaling system to his plant. It should be realized that the operation of the present invention enables the output left and right program channels from a stereo receiver 80 shown in FIG. 3, comprising the decoder left and right stereo channels L and R, to include as part of the difference component of these left and right signals the tone signal or signals generated according to the present invention. Of course, the left and right stereo channel signals are obtained by receiver 80 in a conventional manner from an FM stereo multiplex signal received via an antenna 82.

Most component stereo receivers conventionally include tape output jacks and tape monitor input jacks which function in the following manner. The program output by receiver 80, when the receiver is in an FM selected mode, also appears on the tape output jacks, ostensibly so that such a program can be recorded on an auxiliary tape unit. The tape monitor input jacks are designed to feed back to the receiver 80 the program signals as they have been recorded on the tape unit. By switching on a tape monitor switch, it is this latter signal which is coupled to the amplifier portion of the receiver and out to its loudspeaker output jacks. Consequently, it has been conventional practice in the prior art to use such a system to add auxiliary devices which may be coupled into this chain to modify program signals and then feed them back into a receiver via the tape monitor input jacks, such that the output of the receiver reflects this altered signal when the tape monitor switch is on. In the preferred embodiment of the present invention, an auxiliary signal processing system 84 may include means for detecting the signaling tones generated on the FM stereo signal according to the present invention such that an audio signal processing of the stereo signal is performed and the resultant stereo signal may then be fed back to receiver 80, to be output by the receiver 80 via its tape monitor input jacks.

Of course, addition of such an auxiliary processing circuit 84 could also be performed by a receiver manufacturer totally internally to a receiver 80 to eliminate the need for use of the tape monitor circuitry. Similarly, the altered left and right channel signals output by an auxiliary signal processing system 84 may be fed to a separate amplifier means (not shown), and not back to receiver 80, for production of the altered audio program.

In any case, the auxiliary processing circuit 84 includes means for detecting the one or more auxiliary signaling tones existing on the stereo signal. Specifically, a difference amplifier 86 generates the L−R difference signal from the left and right stereo signals decoded in the stereo reciever 80. This difference amplifier is followed by a low-pass filter (not shown) intended to remove higher-frequency difference information, normally a part of the stereo program, which might impede signaling tone detection. If the highest frequency signaling tone were 30 Hz, the cutoff frequency for this filter could be less than 50 Hz. This difference signal is then fed to one or more tone detectors 88, each designed to detect a tone of a predetermined frequency. As can be seen in FIG. 3, a plurality of such tone detectors 88 are useable for this purpose, i.e. tone detectors 1−N. Tone detectors 88 are designed such that they output a control signal, such as a digital "on" signal whenever the tone designed to be detected by said tone detector has been in fact detected. Such an output control signal may be used to turn on an indicator light 90 thereby indicating to a listener that the auxiliary signal processing indicative of that signal light is being performed by the broadcaster of that stereo signal. The control output of each tone detector 88 may also be used to actuate one or more auxiliary signal decoding devices 92, each of which acting to modify the program signal detected by stereo receiver 80 in such a manner to take advantage of the features implemented by the broadcaster, e.g., acting to reverse any signal limiting that the broadcaster may have created on the program signal, taking advantage of noise reduction circuitry modifications to the signal, etc., to thereby enable the listener using such circuits to obtain a reproduced program signal of highest possible quality.

FIGS. 4 and 5 illustrate alternate preferred embodiments of tone detectors 88 according to the present invention. FIG. 4 illustrates a tone detector comprising a narrow band filter 94 and a broader band-pass filter 96 both feeding an amplifier 98 which acts as a subtractor in a conventional manner. Thus, the output of filter 94 is subtracted from the output of filter 96, giving an output that enables energy to pass only in the region around the fixed frequency point of a signaling tone that is being looked for. Decision logic 100 is provided to determine whether or not the received signal does in fact contain the signaling tone of interest. This scheme offers immunity from false actuations by noise near the signaling frequency since broadcasters using signaling would avoid the transmission of such noise, so that discrimination is more likely. Conventional turn on and turn off delays may be coupled from circuitry 102 to decision logic 100, to enable more precise decoding of the signaling tone.

FIG. 5 illustrates that a phase-locked loop 104 may also be used to detect a signaling tone of a predetermined frequency. Using a phase-locked loop, such as a 567-type integrated circuit, one approach would be to monitor the control voltage of the phase-locked loop's voltage controlled oscillator and to inhibit the associated decision logic 106 from changing state while the control voltage of the voltage controlled oscillator is noisy. Similar to the operation of the embodiment shown in FIG. 4, conventional turn on or turn off delay circuitry 108 may be coupled to decision logic 106 to aid in the precise detection of a signaling tone.

Although a signaling tone is generated as shown in FIG. 1 as a function of the state of a switch 36, it is contemplated as being within the scope of the present invention to provide means for coding one or more signaling tones in conventional, but more sophisticated, ways, for providing more sophisticated transfer of information as part of such an in-band signaling tone system. For example, a more sophisticated in-band signaling system may call for the encoding of two tones to be made as part of a frequency shift keying (FSK) modulation technique. Alternatively, a given tone may be amplitude modulated as a function of the operation of some auxiliary device 60. For example, an auxiliary circuit 60 may operate to have variable effect on a program signal as a function of the present state of such a program signal. An auxiliary device may vary its attenuation of such a signal above some selected frequency point, for example, as a function of the strength of such signals. This auxiliary device may then output a signal indicative of the modifications being performed by the auxiliary device. Such information can be coupled to a receiver for enabling the receiver to reverse this process by means of such a more sophisticated tone signaling method. For example, the normal signal compression used in broadcasting to control modulation levels may be symmetrically "expanded" by causing a signaling tone to be modulated so as to reflect this compression, and this information used to control an expander in the receiver. This could be done as simply as injecting a tone before the AGC/limiter (20) of FIG. 1, or by more elaborate control schemes.

More sophisticated tone detection circuits are also contemplated within the scope of the present invention. For example, a receiver auxiliary circuit 84 may be designed such that it will only operate when two separate tones are simultaneously detected by the circuit 84.

It is therefore of course understood that although the preferred embodiments of the present invention have been illustrated and described above, various other modifications, alternatives and equivalents thereof will become apparent to those skilled in the art and, accordingly, the scope of the present invention should be defined only by the appended claims and equivalents thereof.

What is claimed is:

1. In a stereo transmission system for generating and transmitting an FM multiplex signal derived from left and right audio frequency stereo channels, said multiplex signal including a sum channel containing the summed left and right stereo channel signals and a difference channel containing the difference between said left and right stereo channel signals, an in-band signaling system comprising:
   means for generating at least one low frequency audio tone;
   means for generating from each said audio tone first and second component signals, said first component signal being substantially of equal amplitude and 180° out of phase with said second component signal; and
   summing means for summing each said first component signal with said left stereo channel and for summing each said second component signal with said right stereo channel such that when FM multiplexed, each said tone appears substantially only on said difference channel.

2. The in-band signaling system of claim 1 wherein said tone generating means generates each said low frequency audio tone in a band of frequencies between 15 Hz and 200 Hz, and wherein no generated tone is of the same frequency as any other generated tone.

3. The in-band signaling system of claim 1 further comprising switching means for controlling whether or not each tone is generated by said tone generating means as a function of the present operative state of a respective predetermined auxiliary circuit in said transmission system.

4. The in-band signaling system of claim 1 further comprising means for modulating at least one said tone as a function of the present operative state of a predetermined auxiliary circuit in said transmission system associated with such tone.

5. The in-band signaling system of claim 1 wherein said means for generating at least one low frequency audio tone includes one or more tone generators, each said tone generator outputting a separate fixed low frequency audio tone signal;
   switching means for separately controlling each tone generator such that a tone is generated as a function of the present state of a predetermined respective auxiliary circuit; and
   means for summing the tones generated by each said tone generator.

6. The in-band signaling system of claim 1 wherein said means for generating first and second component signals including a first amplifier for output of said first component signal, and a second amplifier connected to the output of said first amplifier, operative to invert the output of said first amplifier, for output of said second component signal of substantially equal amplitude and 180° out of phase with said first component signal.

7. The in-band signaling system of claim 6 wherein said means for generating said first and second component signals further includes:
   means for varying equally the amplitude of each said component signal, to enable adjustment of the level of such signals with respect to the signal level of said left and right stereo channels;
   means for adjusting the amplitude of said second component signal with respect to said first component signal; and
   means for selectively coupling a calibration signal to said first and second amplifiers, said calibration signal having an amplitude that is a predetermined multiple of the amplitude of said low frequency audio tone.

8. The in-band signaling system of claim 1 further comprising means for eliminating stereo separation information between said left and right stereo channels below a predetermined cutoff frequency.

9. In a stereo transmitter for generating and transmitting an FM multiplex signal from left and right stereo channels, said stereo transmitter including auxiliary signal processing for modifying said stereo channel signals in a predetermined manner and for outputting a control signal indicative of said modification, an in-band signaling system comprising:
   means for generating a low frequency auido tone, including means for modulation of said tone as a function of said control signal;
   means for generating first and second component signals from said audio tone, said first component signal being of equal amplitude and 180° out of phase with said second component signal; and
   summing means for summing said first component signal with said left stereo channel and for summing said second component signal with said right stereo channel.

10. In a stereo transmitter for generating and transmitting an FM multiplex signal derived from left and right stereo channels, said multiplex signal including a sum channel containing the summed signals from said left and right stereo channel signals modulated on a main carrier and a difference channel containing signals comprising the difference between signals from said left and right stereo channels modulated on a 38 kHz subcarrier, said stereo transmitter including auxiliary signal processing for modifying said stereo channel signals in a predetermined manner and for outputting a control signal indicative of said modification, an in-band signaling system comprising:
   means for generating a low frequency audio tone, including means for modulating such tone as a function of said control signal;
   means for generating first and second component signals from said audio tone, said first component signals being of substantially equal amplitude and 180° out of phase with said second component signal; and
   summing means for summing said first component signal with said left stereo channel and for summing said second component signal with said right stereo channel, such that said first and second component signals appear substantially only on said 38 kHz subcarrier.

11. An automatic tone detecting apparatus for receiving a transmitted FM stereo multiplex signal containing at least one low frequency audio tone modulated substantially only on the 38 kHz subcarrier of said FM stereo signal, comprising:
   means for detecting the existence of each said low frequency tone on said 38 kHz subcarrier; and
   means responsive to said tone detection for activating an auxiliary circuit, said auxiliary circuit remaining activated so long as said tone continues to be detected by said tone detector means.

12. A blend circuit for eliminating stereo separation information between left and right stereo signals below a predetermined cutoff frequency comprising:

means for generating a signal that is the algebraic difference between said left and right stereo signals;

low pass filter means for filtering said difference signal, and for outputting a low pass signal having only those frequency components substantially below the cutoff frequency of said low pass filter of said signal means; and means for algebraically subtracting one half of said low pass signal from said left stereo channel and for algebraically adding one half of said low pass signal to said right stereo channel.

13. The blend circuit of claim 12 further comprising means for adjusting the phase of said left and right stereo channel signals to compensate for the phase shift generated by said low pass filter means.

14. An in-band signaling system comprising:

a transmitter for transmitting an FM stereo multiplex signal derived from left and right stereo channels;

a receiver for receiving said FM multiplexed signal and for reconstituting said left and right stereo channels therefrom;

said transmitter including means for generating a low frequency audio tone; means for generating first and second component signals from said audio tone, said first component signal being of substantially equal amplitude and 180° out of phase with said second component signal; and summing means for summing said first component signal with said left stereo channel and for summing said second component signal with said right stereo channel; and said receiver including means for detecting the existence of said tone; and means for activating an auxiliary circuit in said receiver for so long as said tone continues to be detected by said receiver.

15. A method of generating an in-band signaling tone and for incorporating said tone as part of an FM multiplex signal derived from left and right stereo channels comprising the steps of:

generating a low frequency audio tone;

generating a tone of opposite phase to said low frequency tone;

adding said low frequency audio tone to one of said stereo channels; and adding said opposite phase tone to the other of said stereo channels.

16. The automatic tone detecting apparatus of claim 11 wherein said FM stereo signal contains a first audio tone at a first frequency and a second audio tone at a second frequency, said auxiliary circuit remaining activated so long as each of said first tone and said second tone continue to be detected by said tone detector means.

17. The automatic tone detecting apparatus of claim 11 wherein said detecting means includes:

a narrow band filter having a center frequency substantially equal to the frequency of said tone;

a broad band filter having a center frequency substantially equal to the frequency of said tone, said FM stereo signal also having a difference signal modulated on said subcarrier, said difference signal being applied to each of said narrow band filter and said broad band filter;

means for subtracting the output of said narrow band filter from the output of said broad band filter for developing an output signal having a spectrum limited to the region around the frequency of said tone; and logic means responsive to said output signal for determining if said difference signal contains said tone.

18. The automatic tone detecting apparatus of claim 11 wherein said detecting means includes a phase lock loop tone detector including:

a voltage controlled oscillator;

means for monitoring the control voltage of said voltage controlled oscillator; and means responsive to said monitoring means for indicating the detection of said low frequency tone if said control voltage is not noisy.

19. The automatic tone detecting apparatus of claim 11 further comprising:

means for detecting modulation of said tone, said auxiliary circuit having a variable effect on the received FM stereo signal as a function of said modulation.

20. The automatic tone detecting apparatus of claim 11 wherein said tone is encoded to contain frequency shift keyed modulation, said apparatus further comprising modulation detecting means for decoding said frequency shift keyed modulation.

21. The automatic tone detecting apparatus of claim 11 wherein said low frequency tone has a frequency equal to or less than 200 Hz.

22. An automatic tone detecting apparatus for receiving a transmitted FM stereo multiplex signal having a sum and a difference channel, the sum channel being modulated on the FM carrier and the difference channel being modulated on a subcarrier of said carrier, said multiplex signal further containing at least one low frequency audio tone modulated substantially only on said subcarrier, comprising:

means for detecting the existence of each said low frequency tone on said subcarrier; and means responsive to said tone detection for activating an auxiliary circuit, said auxiliary circuit remaining activated so long as said tone continues to be detected by said tone detector means.

* * * * *